(12) United States Patent
Hegazy et al.

(10) Patent No.: US 9,159,022 B2
(45) Date of Patent: Oct. 13, 2015

(54) SYSTEM, METHOD AND PROGRAM PRODUCT FOR AUTOMATICALLY SUPPLYING MISSING PARAMETERS FOR MATCHING NEW MEMBERS OF A POPULATION WITH ANALOGOUS MEMBERS

(71) Applicants: Repsol S.A., Madrid (ES); International Business Machines Corporation, Armonk, NY (US)

(72) Inventors: Mohamed Ahmed Hegazy, Heliopolis Cairo (EG); Sonia Mariette Embid Droz, Madrid (ES); Elena Margarita Alvarez Escobar, Madrid (ES); Maria Jose Lopez Perez-Valiente, Madrid (ES); Hilario Martin Rodriguez, Mostoles (ES); Ulisses Mello, Blauvelt, NY (US); Cicero Nogueira Dos Santos, Rio de Janeiro (BR); Marcos Rodrigues Vieira, Rio de Janeiro (BR); Bianca Zadrozny, Rio de Janeiro (BR)

(73) Assignees: REPSOL, S. A., Madrid (ES); International Business Machines Corporation, Armonk, NY (US)

( * ) Notice: Subject to any disclaimer, the term of this patent is extended or adjusted under 35 U.S.C. 154(b) by 296 days.

(21) Appl. No.: 13/677,289

(22) Filed: Nov. 14, 2012

(65) Prior Publication Data

US 2014/0136462 A1    May 15, 2014

(51) Int. Cl.
*G06N 5/02*    (2006.01)
*G06N 5/04*    (2006.01)
*G06N 5/00*    (2006.01)

(52) U.S. Cl.
CPC .. *G06N 5/02* (2013.01); *G06N 5/00* (2013.01); *G06N 5/04* (2013.01)

(58) Field of Classification Search
None
See application file for complete search history.

(56) References Cited

U.S. PATENT DOCUMENTS

2011/0118983 A1    5/2011  Rowan

OTHER PUBLICATIONS

Hashemi, Logical considerations in applying pattern recognition techniques on seismic data: Precise ruling, realistic solutions, CSEG Recorder, Apr. 2010, pp. 47-49.*
PCT/US2013/068986 ISR Mar. 10, 2014.
Wang "Reservoir Characterization and Horizontal Well Placement Guidance Acquisition by Using GIS and Data Mining Methods", Thesis for University of Calgary, Jun. 2012, http://www.ucalgary.ca/engo_webdocs/XW/12.20355_Baijie%20Wang.pdf.

(Continued)

*Primary Examiner* — Wilbert L Starks
(74) *Attorney, Agent, or Firm* — Law Office of Charles W. Peterson, Jr.; Louis J. Percello, Esq.

(57) ABSTRACT

A population comparison system, method and a computer program product therefor. A stored list of population members, e.g., hydrocarbon reservoirs, includes parameters for corresponding known characteristics and analogous members for each member. A new population member input receives new member descriptions including parameters for each respective new member. A parameter extraction system automatically extracts an estimated value for each missing key parameter, providing a supplemented description. An analogous member selector automatically selects a subset of listed population members as analogous members for each new population member responsive to the supplemented description.

24 Claims, 6 Drawing Sheets

(56) References Cited

OTHER PUBLICATIONS

Holdaway Let Oil and Gas Talk to You: Predicting Production Performance, Apr. 2012. 5 http://support.sas.com 25 A Iresources/papers!proceedings121342-2012.pdf.

J.E. Hodgin et al., "The Selection, Application, and Misapplication of Reservoir Analogs for the Estimation of Petroleum Reserves" SPE 102505, 2006.

Vikas Bhushan et al., "A Novel Approach to Identify Reservoir Analogues," SPE 78338, Shell International Exploration and Production, 2002.

Amir Navot et al., "Nearest neighbor based feature selection for regression and its application to neural activity," Advances in Neural Information Processing Systems 18, 2006.

Hamarat et al., "A genetic algorithm based feature weighting methodology" International Conference on Computers and Industrial Engineering, Fac. of Technol., Policy & Manage., Delft Univ. of Technol., Delft, Netherlands, 2010.

* cited by examiner

| PARAMETER | VALUE |
|---|---|
| RESERVOIR | [CR73] |
| BASIN CODE (KLEMME) | 31 |
| BASIN CODE (BALLY) | 322 |
| PRESENT TECTONICS CODE | 8 |
| FLUID TYPE CODE | 1 |
| PRINCIPAL STRUCTURAL CODE | 8 |
| PRIMARY TRAP TYPE CODE | 2212 |
| SECONDARY TRAP TYPE CODE | ???? |
| NUMBER OF STRUCTURAL COMPARTMENTS | ???? |
| NUMBER OF STRATIGRAPHIC COMPARTMENTS | ???? |
| DIP ANGLE (deg.) | ???? |
| AREA (Km2) | 16 |
| ORIGINAL TOTAL HC COLUMN HEIGHT (m) | ???? |
| TOP RESERVOIR DEPTH (m) | 2305 |
| ORIGINAL TEMPERATURE GRADIENT (degC/m) | 0.05 |
| TEMPERATURE AT TOP RESERVOIR DEPTH (degC) | 109 |
| ORIGINAL PRESSURE GRADIENT (KPa/m) | ???? |
| PRESSURE AT TOP RESERVOIR DEPTH (KPa) | ???? |
| PRIMARY LITHOLOGY CODE | 4 |
| PRIMARY SEDIMENTARY SYSTEM CODE | 11 |
| PRIMARY SEDIMENTARY ENVIRONMENT CODE | 112 |
| DIAGENETIC PROCESS CODE | 3 |
| FRACTURED RESERVOIR CLASSIFICATION CODE | 2 |
| PRIMARY POROSITY TYPE CODE | ???? |
| SECONDARY POROSITY TYPE CODE | ???? |
| AVERAGE GROSS THICKNESS (m) | 87 |
| AVERAGE NET PAY (m) | 43 |
| AVERAGE MATRIX POROSITY (%) | 10 |
| AVERAGE AIR PERMEABILITY (mD) | 10 |
| AVERAGE WATER SATURATION (%) | 22 |
| AVERAGE API GRAVITY | 34.4 |
| PRIMARY DRIVE MECHANISM CODE | 1 |

Fig. 2

SYSTEM, METHOD AND PROGRAM PRODUCT FOR AUTOMATICALLY SUPPLYING MISSING PARAMETERS FOR MATCHING NEW MEMBERS OF A POPULATION WITH ANALOGOUS MEMBERS

BACKGROUND OF THE INVENTION

1. Field of the Invention

The present invention is related to valuating hydrocarbon reservoirs and more particularly to automatically supplying missing parameters for a newly identified reservoir and an uncertainty associated with each supplied parameter, parameters that are necessary for accurately selecting analogous reservoirs and valuating each new hydrocarbon reservoir.

2. Background Description

The total amount of material that is ultimately recoverable from each new hydrocarbon reservoir (production potential) and the cost of recovering that material, or capture difficulty, determine the inherent value of the reservoir. Until the material is actually recovered, however, that inherent value can only be estimated from different reservoir properties. Many of these reservoir properties may be known, and many of them may be unknown. Previously, estimates were based on existing reservoirs that have similar properties limited to those known for the new reservoir. These existing reservoirs with similar properties are known as "analogous reservoirs." Typically, one or more experts identified and selected analogous reservoirs, based solely on experience and the known properties for the new reservoir. When enough is known about a new reservoir, however, what is known as a similarity function may be used to automate, or at least partially automate, selection.

Similarity functions have found many uses in the art for comparing members of a collection of objects, or population, and selecting those objects that, although they not identical, are recognizably similar. Instead of a true/false (1/0) result, a typical state of the art similarity function quantifies the similarity between two objects. So, in a typical state of the art approach to valuating reservoirs, an expert (or experts) first selected the analogous reservoirs. Then, the expert(s) selected similarity function parameters and weights based on personal knowledge and experience, perhaps using local search methods, such as gradient descent and genetic algorithms. The similarity function could then be applied to the analogous reservoirs to estimate the value of the new reservoir.

However, missing or unknown properties make selecting the closest analogous reservoirs guesswork at best, and further, make estimating the value error prone. A mis-valuation could lead to wasted resources, e.g., from passing on an undervalued reservoir to exploiting an overvalued reservoir. Missing parameters increase the likelihood of a mis-valuation.

Thus, there is a need for improved, more complete descriptions of new reservoirs used in valuating the new reservoirs; and, more particularly for supplementing incomplete descriptions of new reservoirs with fact based estimates of missing description parameters and providing an uncertainty associated with the estimates, such that the supplemented descriptions facilitate selecting existing hydrocarbon reservoirs as analogous, and valuating the new reservoirs with a known uncertainty as to the result.

SUMMARY OF THE INVENTION

A feature of the invention is a supplemented descriptions of new reservoirs used in valuating the new reservoir;

Another feature of the invention is incomplete descriptions of new reservoirs are supplemented with estimates of missing description parameters and any uncertainty associated with the estimates, based on cataloged characteristics of existing reservoirs;

Yet another feature of the invention is selection of an optimum subset of known reservoirs as analogous reservoirs with a known uncertainty for valuating or appraising each newly discovered reservoir, based on an initially incomplete description of the new reservoir as supplemented with estimates of missing description parameters derived from cataloged characteristics of existing reservoirs.

The present invention relates to a population comparison system, method and a computer program product therefor. A stored list of population members, e.g., hydrocarbon reservoirs, includes parameters for corresponding known characteristics and analogous members for each member. A new population member input receives new member descriptions including parameters for each respective new member. A parameter extraction system automatically extracts an estimated value for each missing key parameter, providing a supplemented description. An analogous member selector automatically selects a subset of listed population members as analogous members for each new population member responsive to the supplemented description.

One embodiment is a population comparison method comprising: storing a list of population members and corresponding member characteristics parameters describing each listed member; receiving a description for a new population member, said description missing one or more member characteristics parameters; automatically estimating a value for at least one missing member characteristic parameters responsive to stored said member characteristics parameters; supplementing said description with each estimated value; automatically comparing the supplemented description against stored descriptions for each listed member; and selecting a subset of listed members as analogous members for said new population member responsive to the comparison.

In this embodiment at least one missing member characteristics parameters is a key parameter (KP). A plurality of said KPs are identified as controlling KPs (CKPs), and one or more said at least one missing member characteristics parameters is a CKP. Automatically estimating estimates values for CKPs, estimated said values supplementing said description, missing said values for said KPs not identified as CKPs remaining unknown. Automatically estimating CKP values determines an uncertainty for each estimated value, and automatically comparing providing a cumulative uncertainty for said each listed member responsive to determined uncertainties for estimated values. Automatically estimating estimates values for remaining unknown KPs responsive to said selected subset.

Further in this embodiment, automatically estimating comprises applying a similarity function to said description, said similarity function being derived from said stored member characteristics parameters. Before storing said list, the method further comprises pre-processing raw member data, said raw member data including an entry for said each listed member, each said entry including said corresponding member characteristics parameters; eliminating outlier members; transforming, normalizing and standardizing listed member characteristics parameters; and storing said list of population members. Pre-processing selectively replaces hierarchical parameters, chronological parameters and ranking parameters. The method may further comprise: selecting a member as a target, one or more other members being previously identified as analogous members for said target; selecting member KPs as controlling KPs (CKPs); weighting said KPs in a similarity function to compare said target to other members, the weights and similarity function being adjusted to select said previously identified analogous members; return to select another member as a target until all members have been selected; and storing said weights and similarity function, said similarity function being applied to said description, said weights being applied to said new member characteristics parameters to estimate missing new member characteristics parameters. The population may comprise hydrocarbon reservoirs, population members being known hydrocarbon reservoirs, and said new population member being a new hydrocarbon reservoir.

Another embodiment is a reservoir valuation method comprising: configuring known reservoir data including an entry for each known reservoir and corresponding reservoir characteristics parameters; selecting controlling features from stored said reservoir characteristics parameters; storing configured said known reservoir data in a refined list of known reservoirs; receiving a description for a new reservoir, said description missing values for one or more reservoir characteristics parameters; automatically estimating a value for at least one missing value responsive to said stored list; supplementing the new reservoir description with each estimated value; automatically comparing the supplemented new reservoir description against each listed reservoir; and selecting a subset of listed reservoirs members as analogous reservoirs responsive to the comparison.

In this embodiment, configuring known reservoir data comprises: pre-processing raw known reservoir data; transforming, normalizing and standardizing listed known KPs; and storing said refined list of known reservoirs. Pre-processing selectively replaces hierarchical parameters, chronological parameters and ranking parameters. Selecting controlling features comprises: selecting a known reservoir as a target, one or more other known reservoirs being previously identified as analogous reservoirs for said target; selecting KPs as controlling KPs (CKPs); weighting said KPs in a similarity function to compare said target to other known reservoirs, the weights and similarity function being adjusted to select said previously identified analogous reservoirs; return to select another known reservoir as a target until all known reservoirs have been selected; and storing said weights and similarity function, said similarity function being applied to said description, said weights being applied to said new reservoir characteristics parameters to estimate missing new reservoir characteristics. One or more said at least one KP missing a value is a CKP, and automatically estimating estimates values for CKPs, estimated values supplementing said description, missing new reservoir KPs not identified as CKPs being automatically estimated responsive to said selected subset. Automatically estimating CKP values determines an uncertainty for each estimated value, automatically comparing provides a cumulative uncertainty for said each identified analogous reservoirs responsive to determined uncertainties for estimated said key parameter values.

Another embodiment is a computer program product for comparing members of a population, said computer program product comprising a computer usable medium having computer readable program code stored thereon, said computer readable program code causing one or more computer executing said code to: store a list of population members and corresponding member characteristics parameters describing each listed member; receive a description for a new population member, said description missing one or more member characteristics parameters; automatically estimate a value for at least one missing member characteristic parameters responsive to stored said member characteristics parameters; supplement said description with each estimated value; automatically compare the supplemented description against stored descriptions for each listed member; and select a subset of listed members as analogous members for said new population member responsive to the comparison.

Yet another embodiment is a computer program product for valuating reservoirs, said computer program product comprising a computer usable medium having computer readable program code stored thereon, said computer readable program code causing a computer executing said code to: configure known reservoir data including an entry for each known reservoir and corresponding reservoir characteristics parameters; select controlling features from stored said reservoir characteristics parameters; store configured said known reservoir data in a refined list of known reservoirs; receive a description for a new reservoir, said description missing values for one or more reservoir characteristics parameters; automatically estimate a value for at least one missing value responsive to said stored list; supplement the new reservoir description with each estimated value; automatically compare the supplemented new reservoir description against each listed reservoir; and select a subset of listed reservoirs members as analogous reservoirs responsive to the comparison.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an example of a new member description for a typical newly discovered hydrocarbon reservoir, listing characteristics and corresponding known values for each;

DESCRIPTION OF PREFERRED EMBODIMENTS

Figure 1:
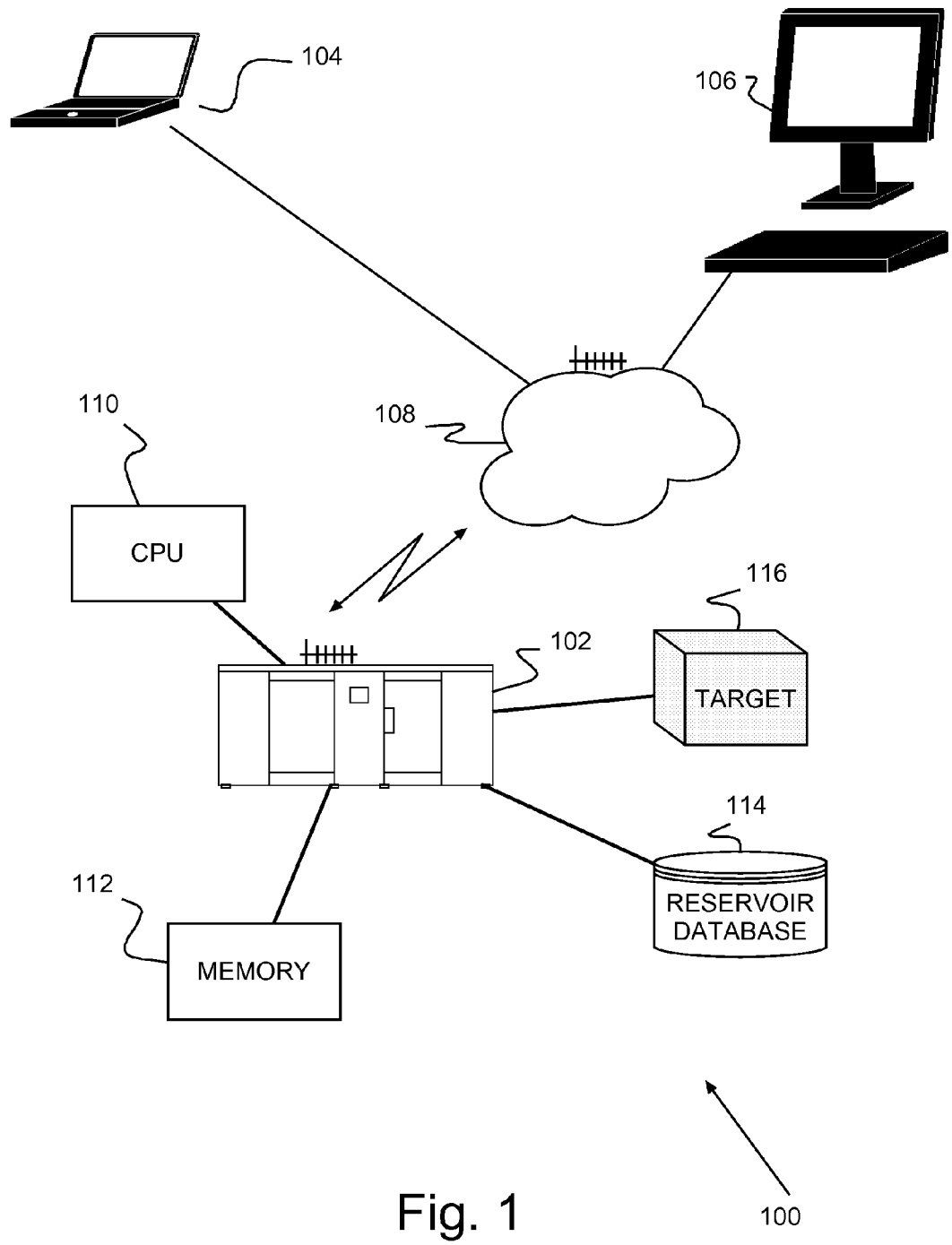
FIG. 1 shows an example of an appraisal system determining a qualified valuation for new population members (e.g., newly discovered hydrocarbon reservoirs) based on partial or incomplete descriptions of the new members, according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of an appraisal system 100 determining analogous population members (e.g., known hydrocarbon reservoirs) and a qualified valuation for new members (e.g., newly discovered hydrocarbon reservoirs), based on partial or incomplete descriptions of the new members, according to a preferred embodiment of the present invention. In particular, the system 100 automatically supplies both estimates of missing parameters of new members based on known characteristics for other existing members, and any uncertainty associated with each estimate. The preferred system 100 uses the qualified supplemented descriptions, qualified by the uncertainty introduced by using estimates, to identify and select analogs, from which a value or values may be determined for the new member and the uncertainty in selected analogs may be subsequently considered.

Preferably, the appraisal system 100 includes one or more computers 102, 104, 106 (3 in this example) coupled, wired or wirelessly to, and communicating with each other over, a network 108. The network 108 may be, for example, a local area network (LAN), the Internet, an intranet or a combination thereof. Typically, the computers 102, 104, 106 include one or more processors, e.g., central processing unit (CPU) 110, memory 112 and local storage 114.

Local storage 114 includes a catalog or master database, e.g., a hydrocarbon reservoirs database, listing known or existing population members. Each list entry includes parameters describing characteristics for a respective member and previously identified analogous members for that member. Preferably, the system 100 trains in two phases, an offline or data preparation phase and an on-line or in-situ phase. Offline, the preferred system 100 refines raw member data, and in cooperation with an expert or experts, selects controlling features or parameters from the data and weights for subsequent on-line use on new members.

There are more than a thousand currently known hydrocarbon reservoirs, for example, including carbonate and plastic reservoirs. Nearly two hundred (e.g., 182) shared characteristics or parameters may be used to describe reservoirs. Each member listed in the member database is described by values for associated parameters, where known. Since some values may be missing or unknown for each member, values for a subset of different parameters may be included for each known member or hydrocarbon reservoir. Of the nearly two hundred different hydrocarbon reservoir parameters, reservoir engineering experts consider a subset (30) as most important reservoir parameters. That subset have been selected/identified as key parameters (KPs). Typically, experts use only the KPs to assess the reservoir potential of any newly discovered reservoir. However, some KPs are identified as more informative than the others. Which KPs are more informative depends on the age of the reservoir characteristic. These more informative KPs are selected, e.g., by an expert, and designated within the system 100 as controlling (CKPs) for a specific assessed characteristic or use case.

On-line, one or more of the computers 102, 104, 106 may operate as a parameter extraction system, e.g., 102, automatically extracting missing parameter values for new members. Another computer may operate as an analogous member selection system, e.g., 104, automatically selecting existing members as analogous. Optionally, the same computer, e.g., 106, may operate as both the parameter extraction system and the analog selection system.

The preferred system 100 completes on-line preparation, using a similarity function and weights, e.g., supplied by an expert, to train the parameter extraction system 102 iteratively. Preferably, the parameter extraction system 102 trains by treating known parameters as missing values and extracts or imputes missing values and an associated uncertainty. In particular, the parameter extraction system 102 generates a suitable (regression or classification) model using machine learning. In particular the regression or classification model trains by estimating KP values and associated uncertainties from other parameters for each member. The analogous member selection system 104 trains by selecting analogous members for existing members in each iteration until the analogs selected on the imputed values match the known analogs closely, e.g., within a selected threshold. The trained system 100 automatically supplements descriptions of new members, e.g., newly discovered reservoirs, by automatically extracting or imputing missing values and an associated uncertainty. Then, the system 100 automatically selects analogous existing members based on that supplemented description.

So, the preferred parameter extraction system 102 extracts estimates for parameters missing from the descriptions 116, based on corresponding characteristics for known members. The preferred parameter extraction system 102 supplements new member descriptions 116 with the estimates for a more complete description. As the supplemented descriptions are not exact, the estimates carry an uncertainty, albeit less uncertainty than the original description. When the preferred parameter extraction system 102 estimates a missing value, it also characterizes the respective uncertainty for subsequent consideration. The analogous member selection system, e.g., 104, uses the supplemented description and respective uncertainty to automatically select analogous members (reservoirs) from the known existing cataloged members. When the analogous member selection system 104 selects analogous reservoirs, the supplemented description carries the uncertainty into the analogous reservoir identification, e.g., for obtaining production potential and/or determining capture difficulty.

So, the preferred parameter extraction system 102 uses the weights and similarity function in-situ on new members for supplementing the new member description with imputed values for missing parameters and determine the uncertainty of estimating missing parameters. The preferred analogous member selection system 104 also selects analogous members from the supplemented description and calculates the uncertainty in the similarity based on the uncertainty in the description. From the selected analogous reservoirs, the system 100 estimates the new member's value accompanied by the corresponding uncertainty of the estimate, resulting in a qualified valuation for the new member or reservoir.

Specific hydrocarbon reservoir characteristics can include, for example, geological aspects, petro-physical parameters, reservoir properties, and development scheme. Geological aspects include, for example, geological age, lithology, depositional environments and the diagenetic and structural history. Petro-physical parameters include, for example, gross thickness, net-to-gross rations, pay thickness, porosity, hydrocarbon saturations, and permeability. Reservoir properties include, for example, depth, pressure, temperature, original fluid content, oil gravity, relative permeability, residual saturations and drive mechanisms. Development scheme includes, for example, well spacing, completion and stimulation, artificial lift, fluid injection, injection volumes. Parameters for these different characteristics may be further typed as numerical, categorical, hierarchical, ordinal and chronological.

FIG. 2 shows an example of a new member description 116 for a typical newly discovered hydrocarbon reservoir, listing characteristics 1160 and corresponding known values 1162 for each. Some of the members have missing or unknown values 1164. As noted hereinabove, the preferred parameter extraction system 102 trains, using machine learning to generate a similarity function and weights that impute missing parameters for the known reservoirs. The preferred parameter extraction system 102 applies the same similarity function to the member description 116, weighting the known values of the newly discovered reservoir description 116 to impute missing parameters 1164 and a corresponding uncertainty.

Although values for all parameters may be potentially knowable, typically, a third of the values for parameters are unknown for one or more of those known hydrocarbon reservoirs. More specifically, nearly a third of the values are missing for more than half of the known reservoirs. Moreover, newly discovered reservoirs frequently have missing values for many more parameters, including key parameters. While for any reservoir, some known reservoirs are identifiably and quantifiably more similar than others, if some key parameters are missing, the closest matches may very well not be selected.

Thus, a preferred system 100 pre-configures a list of existing members, e.g., offline or pre-deployment, for subsequently extracting missing parameter values automatically based on what is known about new members. From this pre-configuration the preferred parameter extraction system 102 trains to estimate missing parameters on-line for any member from other known parameters for that member. Thereafter, new reservoirs are found and incomplete new member descriptions are added with missing parameter values. The preferred parameter extraction system 102 automatically supplements the incomplete description by extracting values and corresponding uncertainties from the refined data, based non known values in the new member description 116. Then, the preferred analogous member selection system 104 selects analogous members for the new member based on the supplemented description with the associated uncertainty for subsequent consideration. The system 100 can use those selected analogous members for valuating the new member with a known uncertainty. Even though the result has an associated uncertainty, it has a higher level of confidence and a known uncertainty, than would be achieved based on analogous members selected based on the original, incomplete description or on a description supplemented using a prior approach.

Figure 3A:
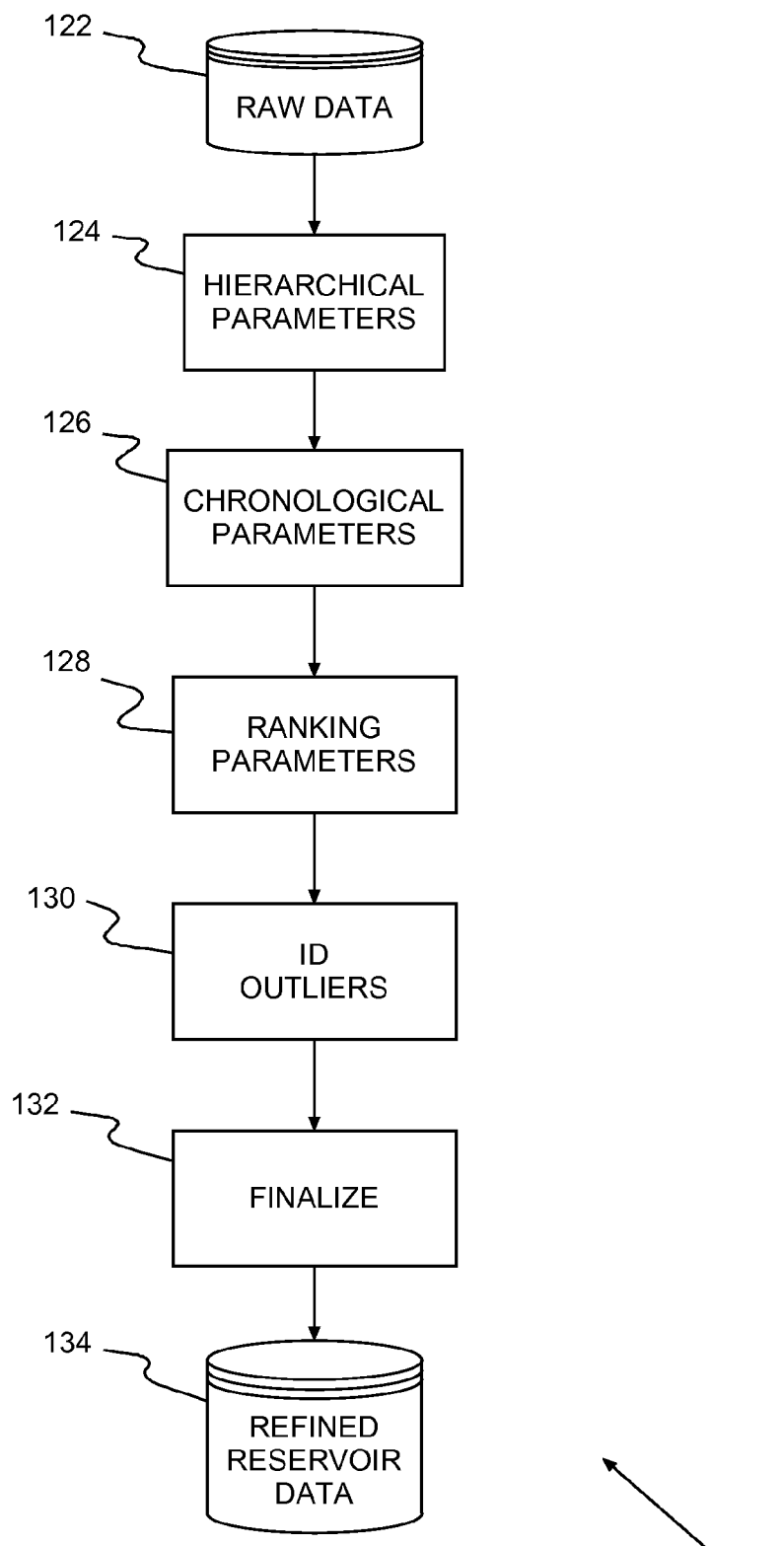
FIGS. 3A-B show an example of offline preparation, wherein training begins by pre-processing raw existing member data and concludes with selecting controlling features for subsequently, interactively evaluating new population members in situ.
Figure 3B:
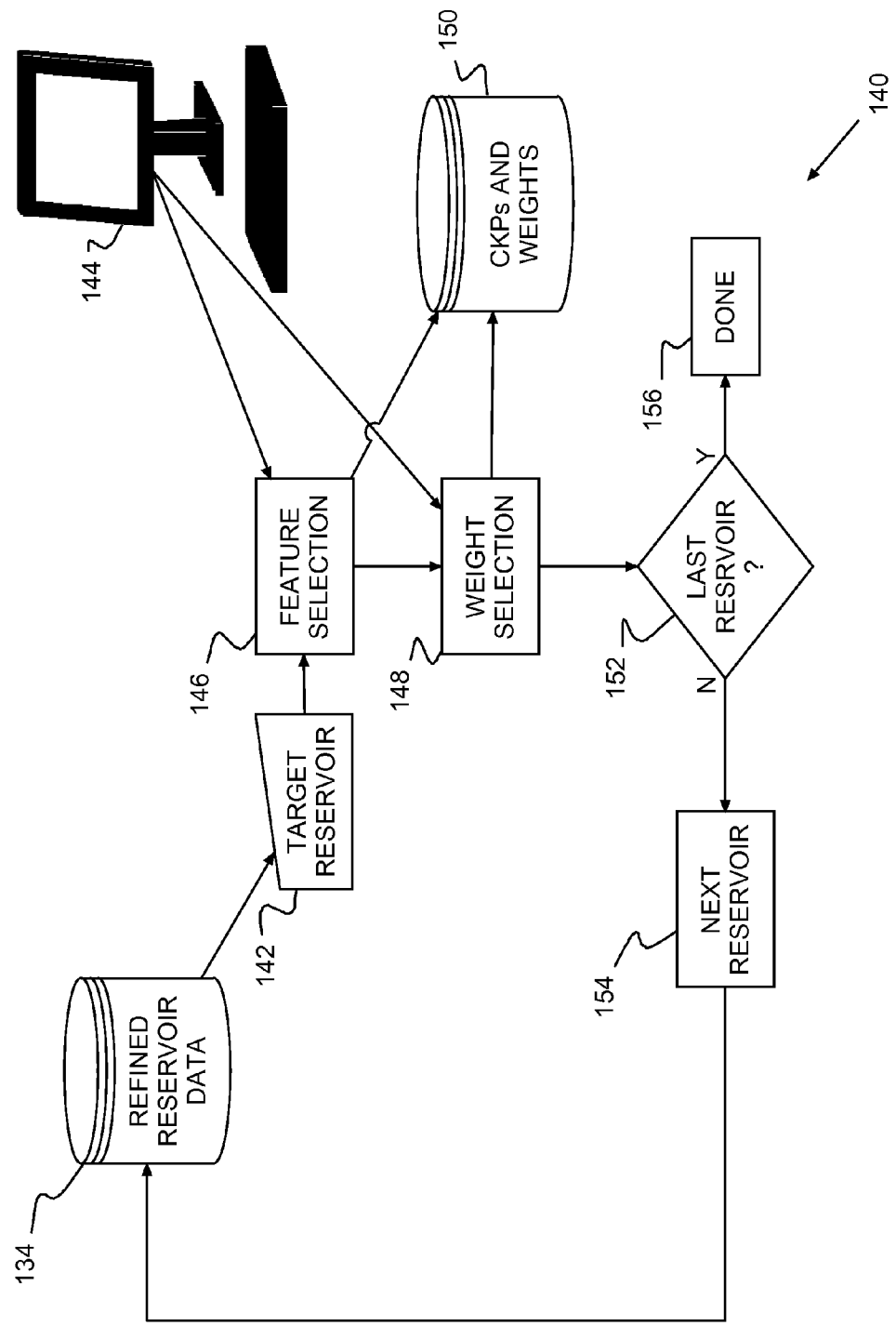

Offline preparation is shown in the example of FIGS. 3A-B, wherein training begins by pre-processing raw existing member data 120 and concludes with selecting controlling features 140 for subsequently evaluating new population members in situ. Primarily, a pre-processing unit prepares the existing data 120 to place it in a more suitable form for statistical methods. A feature selection unit interfaces with experts selecting controlling features 140, or CKPs that have high correlation to the use case target parameters to be predicted.

A master database 122, e.g., in storage 114 in FIG. 1, contains previously collected raw data on existing members (e.g., reservoirs) including known values for parameters characterizing member features. Pre-processing begins by treating hierarchical 124 and chronologic 126 and ranking 128 parameters in the raw data. Then, the system 102 identifies any outliers 130 in the results, e.g., interactively with the help of an expert or, automatically with the use of a statistical tool, and removes the identified outliers. Then, the system 102 finalizes 132 and consolidates the results in a refined database 134 with pre-configured member data, e.g., also in storage 114.

For the present hydrocarbon reservoir example, hierarchical parameters have deep levels that frequently are sparsely populated, containing just a few data points in the lower levels. So, to arrive at more reliable statistics, deeper levels are ignored and two hierarchical parameters values are substituted 124 in the raw data for the two first hierarchical levels only. The first new parameter contains information of the first level of the hierarchy, and the second collapses the information from the first and the second levels. Then, the most recent chronological parameter value is identified and substituted 126 in the raw data for each chronological parameter. Next, the most important value or the one with highest influence is identified and substituted 128 in the raw data for ranking type parameters.

Outlier identification 130 identifies and eliminates of outliers using, for example, SPSS Modeler/Statistics procedures from International Business Machines (IBM) Corporation. Finalization 132 involves, for example, data transformation, normalization and standardization. Preferably, the system 102 applies a suitable Box-Cox transformation to numeric values in the ranked data, and transforms the data to Gaussian distributions (which characterize uncertainty). Gaussian distributions are more appropriate for use in standard state of the art statistical analysis procedures.

FIG. 3B shows an iterative example of selecting controlling features 140 interactively. Each iteration begins by selecting one known member, a reservoir in this example, as a use case or target 142 from the current population members in the refined database 134. The refined database 134 provides reservoir parameter value(s) specified in given use cases, e.g., relative permeability. So, one or more experts 144 interactively identify and list controlling key parameters 146 on a case by case basis, iteration by iteration. The expert(s) also interactively selects weights 148 for weighting the CKPs in similarity function factors used in identifying analogous reservoirs on-line.

After selecting and storing 150 weights and key parameters, if unselected members remain 152 for selecting CKPs, one is selected 154 as a new use case target 142 in the next iteration and CKPs and weights are selected 146, 148. Once CKPs are selected for the last member 152, selection is complete 156.

Figure 4:
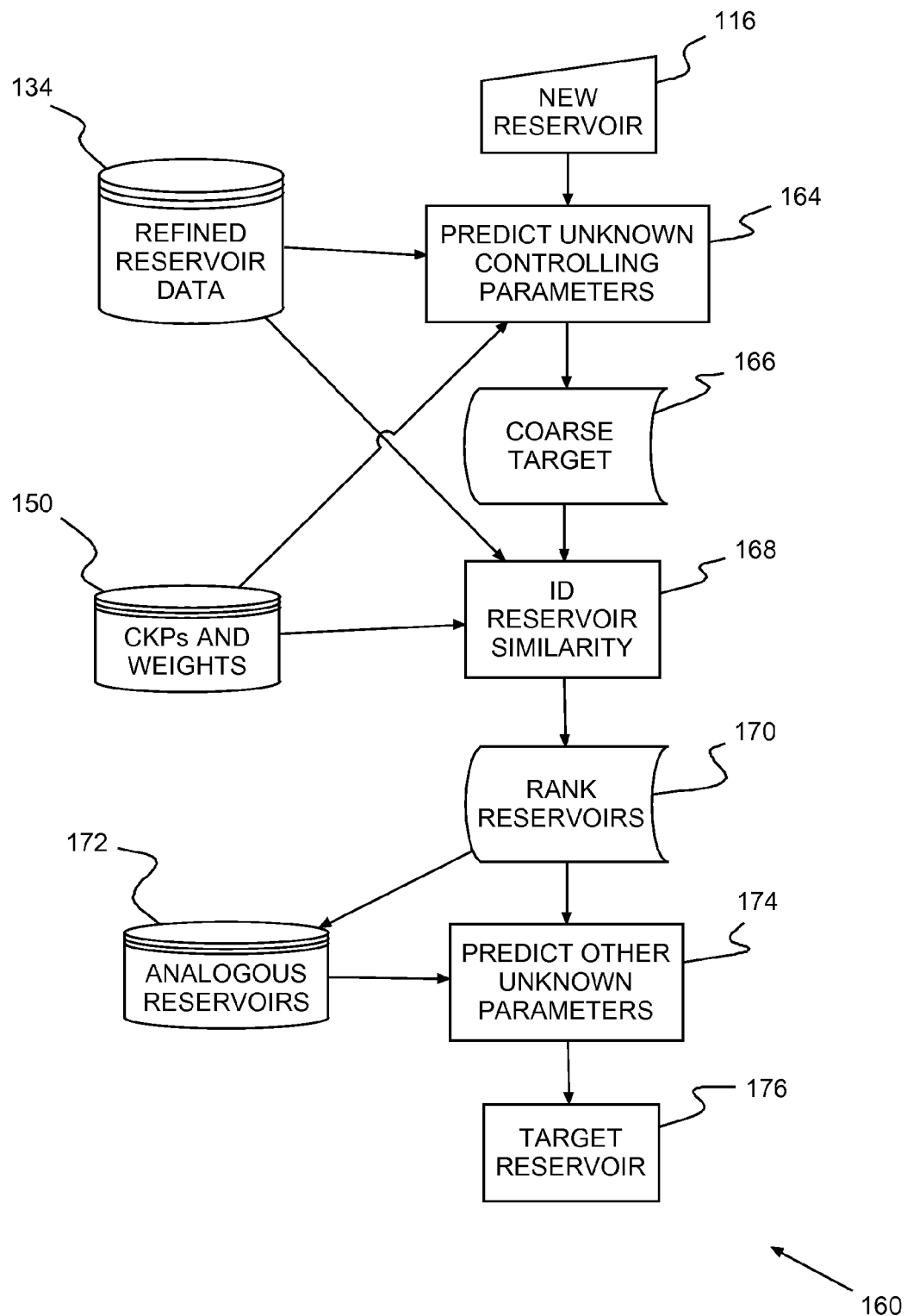
FIG. 4 shows an example of in situ valuation of a new member, e.g., a newly discovered reservoir.

FIG. 4 shows an example of in situ valuation 160 of a new member, e.g., a newly discovered reservoir, according to a preferred embodiment of the present invention. In particular the preferred system (e.g., 100 in FIG. 1), receives a description 116 of a new reservoir and parameter(s) specified in the given use case, e.g., relative permeability. The parameter extraction system 102 automatically supplies an approximation of unknown controlling parameters 164 to generate a modified description of the new reservoir or a coarse target 166. Preferably, the parameter extraction system 102 applies a similarity function to the raw new member data 116 weighted by previously selected weights 150 to arrive at the coarse target 166. The analogous member selection system 104 also applies a similarity function to the coarse target 166 to identify similar reservoirs 168 from the member data in the refined database 134 with an associated uncertainty for each. The members are ranked 170 by similarity and a subset selected as analogous 172. The parameter extraction system 102 uses the analogous reservoirs 172 as a basis for determining any other missing parameters 174, thereby providing a fuller description of the target reservoir 176.

Figure 5:
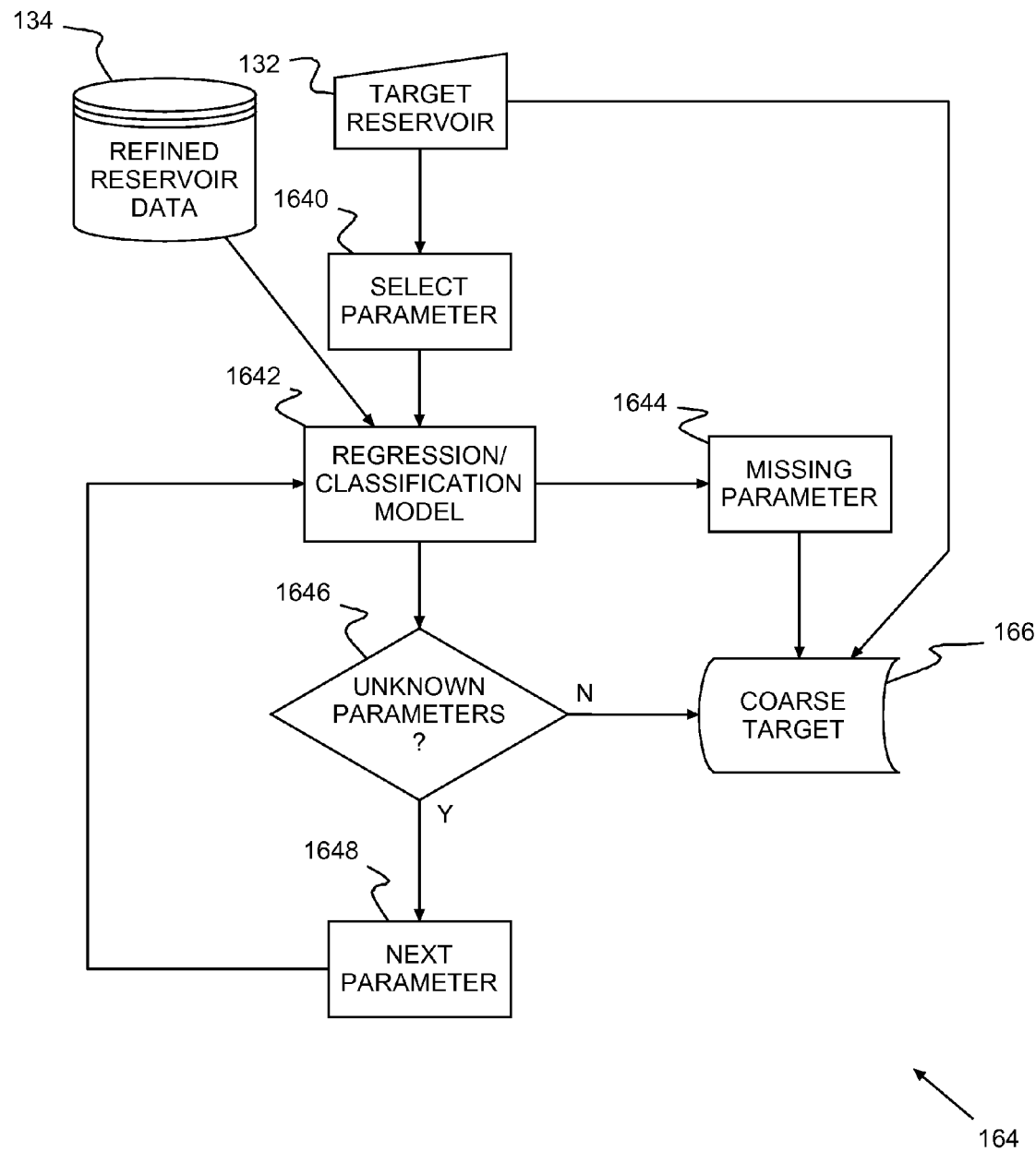
FIG. 5 shows an example of a parameter extraction system predicting unknown controlling parameters.

FIG. 5 shows an example of parameter extraction system 102 predicting unknown controlling parameters 164, iteratively, which begins by selecting 1640 an unknown controlling parameter for the target reservoir 116. Next, for each unknown controlling parameter of the new member data, using a suitable machine learning technique 1642 the extraction system 102 generates a regression model or a classification model from the refined reservoir data 134. The generated model contains references only to CKPs with known values in the new member data 116. Then, the generated model is applied to the new member data 116 to estimate 1644 missing CKP values and an associated uncertainty. Once all unknown CKP values have been selected 1646 and, the new target has been supplemented 1648 with the estimates, a coarse target 166 has been generated for identifying and selecting analogous members 168 with a known uncertainty.

Examples of machine learning techniques that generate suitable regression models 1642 for estimating numerical parameters 1644 (or for identifying analogous reservoirs 172) include linear regression, generalized linear, neural networks, support vector regression, decision trees, and k-nearest neighbors models. Similarly, examples of machine learning techniques that generate suitable classification models for estimating categorical parameters 1644 include linear discriminant analysis, generalized linear, neural networks, support vector machines, decision trees, and k-nearest neighbors (k-nn) models. Only known parameters are model input variables.

Whenever the selected machine learning technique 1642 does not treat missing values, preferably, temporary missing values are imputed by default in the training data. Preferably also, each estimate is constrained to have an error below a selected acceptable error threshold. Typically, the selected method will suggest an error range, e.g., MAE<20-30% or R2>70-80%. A quality criterion value may be selected, e.g., by an expert, to constrain all the estimations to within the suggested range. Some suitable machine learning prediction techniques generate a probability distribution output over the possible values. Otherwise, a probability distribution may be generated, providing a probability mass function when the parameter is nominal; or a probability density function (e.g. normal distribution) when the parameter is continuous. From the probability distribution the value with highest probability is selected as the estimated value 1644.

Preferably, the analogous member selection system 104 applies a suitable similarity function to coarse targets 166 weighted by the previously selected weights 150 to identify analogous reservoirs 168. The similarity function provides an indication (e.g., a figure of merit) of the similarity between the coarse target reservoir 166 and the member reservoirs described in the refined database 134 and a cumulated uncertainty. The preferred analogous member selection system 104 ranks 170 members according to similarity value, most similar member to least similar member or reservoir. While considering that cumulated uncertainty, the analogous member selection system 104 selects a group of the ranked members as analogous, e.g., those reservoirs with a similarity ranking or value above a given threshold are selected as analogous reservoirs 172. Preferably, at least 30 analogous reservoirs are selected, but with a minimum similarity, e.g., greater than a sixty percent (>60%) similarity indication.

Once the analogous reservoirs 172 are selected, any other unknown parameters are estimated 174 based only on the information from the analogous reservoirs 172. Preferably, other missing parameters are predicted for the coarse target 166 from the analogous reservoirs 172 substantially identically to predicting unknown controlling parameters 164 and other member properties (static and dynamic parameters) using only on the information provided by the analogous members or reservoirs. Preferably also, the parameter extraction system 102 estimates a univariate probability distribution for each initially unknown parameter and for any other target properties that may be of interest, solely based on information provided by the analogous reservoirs, e.g., from raw member data in a master database 120 or from member data in the refined database 134. The parameter extraction system 102 may use resulting supplemented member, target reservoir 176, to estimate the value of the new reservoir 116.

Thus advantageously, the preferred valuation system identifies analogous members for each new member, even in the absence of a complete description for the new member. The description is supplemented with estimates for missing parameters that are associated with an uncertainty in the data for new members (e.g., hydrocarbon reservoirs). The supplemented description is used for selecting of an optimum subset of known reservoirs as analogous reservoirs for valuating or appraising each newly discovered reservoir subject to the known uncertainty in the estimates. By training value prediction on known member data, to predict values for missing parameter values, the preferred system supplements initially incomplete descriptions of the new reservoirs with estimates derived from cataloged characteristics of existing reservoirs. Thus, when applied to hydrocarbon reservoir valuation, analogous hydrocarbon reservoirs selection and subsequent valuation are not done blindly, based solely on incomplete data and descriptions. Instead, each valuation is based on likely values and accompanied by an indication of any uncertainty in arriving at that valuation.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. An population comparison system comprising:
   a population storage storing a list of population members and parameters for corresponding known characteristics for each population member, said parameters including hierarchical parameters, chronological parameters and ranking parameters;
   a new population member input receiving new population member descriptions including parameters for each respective new population member;
   a parameter extraction system interactively identifying controlling key parameters (CKPs) in said stored list, automatically extracting an estimated value for missing parameter values, and selectively replacing said hierarchical parameters, said chronological parameters and said ranking parameters, a supplemented description being provided by inclusion of replaced parameters and estimated said values in each new population member description; and
   an analogous member selector automatically selecting a subset of listed population members as analogous members for each new population member responsive to said supplemented description.

2. A population comparison system as in claim 1, wherein a plurality of parameters are identified as key parameters (KPs), said parameter extraction system interactively identifies a plurality of KPs said CKPs, and one or more said at least one missing member parameters is a CKP.

3. A population comparison system as in claim 2, wherein said parameter extraction system automatically estimates values for missing CKP values, the estimated values supplementing said new population member description, missing values for parameters not identified as CKPs remaining unknown.

4. A population comparison system as in claim 3, wherein said parameter extraction system automatically determines an uncertainty for each estimated value, and said analogous member selector automatically provides a cumulative uncertainty for said each listed member responsive to determined uncertainties for estimated values.

5. A population comparison system as in claim 3, said parameter extraction system further automatically estimating remaining unknown values responsive to said selected subset.

6. A population comparison system as in claim 1, wherein said parameter extraction system comprises:
   a data refinement unit refining listed member data; and
   a controlling feature unit interactively identifying said CKPs and projecting said missing characteristics responsive to refined said listed member data.

7. A population comparison system as in claim 6, said data refinement unit comprising:
   means for pre-processing said raw member data, said raw member data including an entry for said each listed member, each said entry including corresponding said parameters;
   means for eliminating outlier members;
   means for transforming, normalizing and standardizing listed member characteristics parameters; and
   means for storing said list of population members in said population storage.

8. A population comparison system as in claim 7, wherein said population comprises hydrocarbon reservoirs, population members being known hydrocarbon reservoirs, and said new population member being a new hydrocarbon reservoir, and wherein said parameter extraction system further comprises training means comprising:
   means for selecting a member as a target, one or more other members being previously identified as analogous members for said target;
   means for receiving selection of member key parameters (KPs) as CKPs;
   means for receiving weights for weighting said KPs in a similarity function to compare said target to other members, the weights and similarity function being adjusted to select said previously identified analogous members; and
   means for storing said weights and similarity function, said parameter extraction system applying said similarity function to said description and said weights to new member said parameters to estimate missing new member parameters.

9. A reservoir valuation system comprising:
  a raw data storage storing a list of descriptions for all known reservoirs, each known reservoir description including parameters for corresponding known reservoir characteristics, said parameters including hierarchical parameters, chronological parameters and ranking parameters;
  a data refinement unit refining said list, refining including interactively identifying controlling key parameters (CKPs) in said list;
  a configured reservoir storage storing the refined list;
  an expert interface receiving weights for a similarity function for estimating parameters for listed known reservoirs;
  a weight storage storing said weights and said similarity function;
  a new reservoir input receiving new reservoir descriptions including parameters for each respective new reservoir;
  a parameter extraction system automatically weighting said similarity function and applying said weighted similarity function to said new reservoir descriptions, an estimated value for missing parameters being selectively extracted, and said hierarchical parameters, said chronological parameters and said ranking parameters being selectively replaced, from application of said weighted similarity function, a supplemented description being provided by selectively replacing said parameters, and inclusion of estimates for missing parameters, in each new reservoir description; and
  an analogous reservoir selector automatically selecting a subset of listed known reservoirs as analogous reservoirs for each new reservoir responsive to said supplemented description.

10. A reservoir valuation system as in claim 9, said data refinement unit comprising:
  means for pre-processing said list;
  means for eliminating listed outliers;
  finalization means for transforming, normalizing and standardizing remaining listed known reservoir parameters; and
  means for storing the finalized said list in said configured reservoir storage.

11. A reservoir valuation system as in claim 10, wherein said means for pre-processing selectively replaces said parameters, and said expert interface comprises:
  means for selecting a listed known reservoir as a target, one or more other listed known reservoirs being previously identified as analogous reservoirs for said target;
  means for receiving selection of key parameters (KPs) as said CKPs; and
  means for receiving weights for weighting said KPs in a similarity function to compare said target to other listed known reservoirs, the weights and similarity function being adjusted to select said previously identified analogous reservoirs, said weights and similarity function being stored in said weight storage.

12. A reservoir valuation system as in claim 11, wherein said parameter extraction system automatically estimates values for missing CKPs, estimated said values supplementing said new reservoir description, missing said values for KPs not identified as CKPs remaining unknown.

13. A reservoir valuation system as in claim 12, wherein said parameter extraction system automatically determines an uncertainty for each estimated value, and said analogous reservoir selector automatically provides a cumulative uncertainty for said each listed known reservoir responsive to determined uncertainties for estimated values.

14. A population comparison system as in claim 12, said parameter extraction system further automatically estimating remaining unknown KP values responsive to selecting said subset.

15. A computer program product for comparing members of a population, said computer program product comprising a computer usable medium having computer readable program code stored thereon, said computer readable program code comprising:
  computer readable program code means for storing a list of population members and parameters for each population member, said parameters including hierarchical parameters, chronological parameters and ranking parameters;
  computer readable program code means for receiving new population member descriptions including parameters for each respective new population member;
  computer readable program code means for interactively identifying controlling key parameters (CKPs) in the stored list;
  computer readable program code means for automatically extracting an estimated value for missing parameter values;
  computer readable program code means for selectively replacing said hierarchical parameters, said chronological parameters and said ranking parameters;
  computer readable program code means for providing a supplemented description from each new population member description, each said supplemented description including replaced parameters and estimates for missing parameters; and
  computer readable program code means for automatically selecting for each new population member a subset of listed population members as analogous members responsive to said supplemented description.

16. A computer program product for comparing members of a population as in claim 15, wherein said computer readable program code means for interactively identifying identifies a plurality of key parameters (KPs) as said CKPs, and one or more of said at least one missing member characteristics parameters is an identified CKP.

17. A computer program product for comparing members of a population as in claim 16, wherein said computer readable program code means for automatically extracting comprises computer readable program code means for estimating values for missing said CKPs, estimated said values supplementing said new population member description, missing values for KPs not identified as a CKP remaining unknown.

18. A computer program product for comparing members of a population as in claim 17, wherein said computer readable program code means for automatically extracting comprises computer readable program code means for automatically determining an uncertainty for each estimated value, and said computer readable program code means for automatically selecting said subset comprises computer readable program code means for automatically providing a cumulative uncertainty for said each listed member responsive to determined uncertainties for estimated values, remaining unknown KPs being estimated responsive automatically selecting said subset.

19. A computer program product for comparing members of a population as in claim 18, wherein said computer readable program code means for automatically extracting comprises:
  computer readable program code means for refining listed member data comprising:
    computer readable program code means for pre-processing said raw member data, said raw member data including an entry for said each listed member, each said entry including corresponding said parameters, computer readable program code means for eliminating outlier members, computer readable program code means for transforming, normalizing and standardizing listed member characteristics parameters, and computer readable program code means for storing said list of population members in said population storage; and computer readable program code means for selectively projecting said missing CKPs responsive to refined said listed member data comprising:

computer readable program code means for selecting a member as a target, one or more other members being previously identified as analogous members for said target, computer readable program code means for receiving selection of member KPs as said CKPs, computer readable program code means for receiving weights for weighting said corresponding parameters in a similarity function to compare said target to other members, the weights and similarity function being adjusted to select said previously identified analogous members, and computer readable program code means for storing said weights and similarity function, said parameter extraction system applying said similarity function to said description and said weights to new member said parameters to estimate missing new member CKPs.

20. A computer program product for valuating reservoirs, said computer program product comprising a computer usable medium having computer readable program code stored thereon, said computer readable program code comprising:

computer readable program code means for storing a list of descriptions for all known reservoirs, each known reservoir description including parameters for corresponding known reservoir characteristics, said parameters including hierarchical parameters, chronological parameters and ranking parameters;

computer readable program code means for refining said list, refining including interactively identifying controlling key parameters (CKPs) in said list;

computer readable program code means for storing the refined list;

computer readable program code means for receiving weights for a similarity function for estimating parameters for listed known reservoirs;

computer readable program code means for storing said weights and said similarity function;

computer readable program code means for receiving new reservoir descriptions including parameters for each respective new reservoir;

computer readable program code means for automatically weighting said similarity function and selectively applying said weighted similarity function to said new reservoir descriptions, an estimated value for selected missing parameters being automatically extracted, and said hierarchical parameters, said chronological parameters and said ranking parameters being selectively replaced, responsive to application of said weighted similarity function;

computer readable program code means for providing a supplemented description responsive to selectively replacing said parameters, and inclusion of estimates for missing parameters, in each new reservoir description; and computer readable program code means for automatically selecting a subset of listed known reservoirs as analogous reservoirs for each new reservoir responsive to said supplemented description.

21. A computer program product for valuating reservoirs as in claim 20, said computer readable program code means for refining said list comprising:

computer readable program code means for pre-processing said list;

computer readable program code means for eliminating listed outliers;

computer readable program code means for transforming, normalizing and standardizing remaining listed known reservoir parameters; and computer readable program code means for storing the finalized said list in said configured reservoir storage.

22. A computer program product for valuating reservoirs as in claim 21, wherein said computer readable program code means for pre-processing selectively replaces said parameters, and said computer readable program code means for automatically weighting comprising:

computer readable program code means for selecting a listed known reservoir as a target, one or more other listed known reservoirs being previously identified as analogous reservoirs for said target;

computer readable program code means for receiving selection of key parameters (KPs) as said CKPs; and computer readable program code means for receiving weights for weighting said KPs in a similarity function to compare said target to other listed known reservoirs, the weights and similarity function being adjusted to select said previously identified analogous reservoirs, said weights and similarity function being stored in said weight storage.

23. A computer program product for valuating reservoirs as in claim 22, wherein said computer readable program code means for automatically weighting automatically estimates CKP values, missing values for KPs not identified as CKPs remaining unknown.

24. A computer program product for valuating reservoirs as in claim 23, wherein computer readable program code means for automatically weighting automatically determines an uncertainty for each estimated value, and computer readable program code means for automatically selecting a subset automatically provides a cumulative uncertainty for said each listed known reservoir responsive to determined uncertainties for estimated values, remaining missing values being provided responsive to selecting said subset.

* * * * *